US012687823B2

(12) United States Patent
Bagoly et al.

(10) Patent No.: US 12,687,823 B2
(45) Date of Patent: Jul. 21, 2026

(54) DISTRIBUTED COMPUTER SYSTEM AND METHOD ENABLING APPLICATION OF AUTONOMOUS AGENTS

(71) Applicants: UVUE Ltd., Bury St Edmunds (GB); FETCH.AI LIMITED, Bury St Edmunds (GB)

(72) Inventors: Attila Bagoly, Bury St Edmunds (GB); Humayun Munir Sheikh, Bury St Edmunds (GB)

( * ) Notice: Subject to any disclaimer, the term of this patent is extended or adjusted under 35 U.S.C. 154(b) by 437 days.

(21) Appl. No.: 18/464,796

(22) Filed: Sep. 11, 2023

(65) Prior Publication Data

US 2024/0302803 A1      Sep. 12, 2024

Related U.S. Application Data

(63) Continuation-in-part of application No. 18/324,024, filed on May 25, 2023, and a continuation-in-part of (Continued)

(51) Int. Cl.
*G05B 13/02* (2006.01)
*G06N 20/00* (2019.01)

(52) U.S. Cl.
CPC ......... *G05B 13/0265* (2013.01); *G06N 20/00* (2019.01)

(58) Field of Classification Search
CPC ............................ G05B 13/0265; G06N 20/00
See application file for complete search history.

(56) References Cited

U.S. PATENT DOCUMENTS

| | | | |
|---|---|---|---|
| 8,352,304 B2 * | 1/2013 | Dasari .................. | G06Q 10/103 |
| | | | 705/7.18 |
| 11,616,686 B1 * | 3/2023 | Chandrachood ...... | G06F 9/5005 |
| | | | 709/220 |

(Continued)

OTHER PUBLICATIONS

Yan Wang et al., PumaMart: a parallel and autonomous agents based internet marketplace, Electronic Commerce Research and Applications 3 (2004) 294-310.*

(Continued)

*Primary Examiner* — Vincent H Tran
(74) *Attorney, Agent, or Firm* — RC Trademark Company

(57) ABSTRACT

Disclosed is distributed computer system enabling application of autonomous agents (AAs) across domains, comprising: primary distributed ledger arrangement to implement software framework that comprises: client-agent device (client-AA) to receive service request (SR), generate objective associated with SR, send objective to agent device (AA); processing arrangement to create clusters of AAs based on similarity of their functionalities; secondary distributed ledger arrangement (SDLA) to coordinate collective learning of AAs by sharing model updates in clusters, AAs in cluster is configured to train computing(s) model, SDLA comprises: first secondary distributed ledger (FSDL), comprising language model module to send context of SR, second secondary distributed ledger (SSDL), comprising machine learning model agent (MLMA) to: send list and protocol specification (PS) update to AA. AA comprises context builder software module to obtain list, PS module to generate PS for fulfilment of SR, and build executor module to compose AAs associated into further autonomous agent (further-AA), further-AA implement PSs to fulfil SR by client-AA.

12 Claims, 3 Drawing Sheets

Related U.S. Application Data application No. 18/318,897, filed on May 17, 2023, and a continuation-in-part of application No. 18/180,896, filed on Mar. 9, 2023.

(56) References Cited

U.S. PATENT DOCUMENTS

| | | | | |
|---|---|---|---|---|
| 12,026,610 | B2 * | 7/2024 | Ma | G06N 3/092 |
| 2021/0248536 | A1 * | 8/2021 | Sheikh | G06F 16/275 |
| 2021/0406782 | A1 * | 12/2021 | Nakayama | G06N 20/20 |
| 2023/0281491 | A1 * | 9/2023 | Hosseini | G06N 5/043 |
| | | | | 706/46 |
| 2023/0368284 | A1 * | 11/2023 | Sheikh | H04L 9/0618 |
| 2024/0364508 | A1 * | 10/2024 | Kancharla | H04L 9/0891 |

OTHER PUBLICATIONS

Jonathan Lee et al., Composing web services enacted by autonomous agents through agent-centric contract net protocol, Information and Software Technology 54 (2012) 951-967.*

* cited by examiner

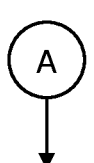

OFFLOAD COLLECTIVE LEARNING TASK FROM PRIMARY DISTRIBUTED LEDGER ARRANGEMENT AND USE MACHINE LEARNING MODEL AGENT TO SEND LIST TO AGENT DEVICE, AND SEND PROTOCOL SPECIFICATION UPDATE TO AGENT DEVICE

210

GENERATE PROTOCOL SPECIFICATION FOR FULFILLING SERVICE REQUEST USING PROTOCOL SPECIFICATION MODULE BASED ON RECEIVED PROTOCOL SPECIFICATION UPDATE

212

COMPOSE EACH AUTONOMOUS AGENT ASSOCIATED WITH OBJECTIVE INTO FURTHER AUTONOMOUS AGENT USING BUILD EXECUTOR MODULE

214

IMPLEMENT PROTOCOL SPECIFICATION(S) TO FULFILL SERVCE REQUEST BY CLIENT-AGENT DEVICE

DISTRIBUTED COMPUTER SYSTEM AND METHOD ENABLING APPLICATION OF AUTONOMOUS AGENTS

CROSS-REFERENCE TO RELATED APPLICATIONS

This application is a continuation-in-part of U.S. patent application Ser. Nos. 18/180,896, 18/318,897 and 18/324,024, which are also incorporated herein by reference.

TECHNICAL FIELD

The present disclosure relates generally to systems for managing interoperability of autonomous agents; and more specifically, to distributed computer systems and methods for enabling application of autonomous agents across plurality of domains.

BACKGROUND

Autonomous agents have gained significant attention in recent years as promising technology for addressing complex tasks across various problem domains. The autonomous agents possess the ability to perceive their environment, make decisions, and take actions autonomously, thereby reducing the need for direct human intervention. However, existing systems that employ autonomous agents face several limitations and challenges that hinder their widespread adoption and effectiveness.

Traditional centralized architectures often struggle to handle large-scale deployments of the autonomous agents. As the number of autonomous agents and the complexity of tasks increase, the centralized control and communication become bottlenecks, leading to performance degradation and inefficiencies. Moreover, coordinating the actions of numerous autonomous agents operating in a decentralized manner becomes increasingly difficult, impeding the distributed computer system's ability to effectively solve complex problems.

Notably, in the domain of the autonomous agents, pivotal challenges surface such as the capacity for effective communication and coordination among the autonomous agents across diverse domains remains complex. Additionally, as the number of the autonomous agents and their associated tasks grows, the scalability of the existing system becomes a concern, necessitating solutions to accommodate this expansion. Moreover, the optimization of computational processes is essential to reduce overhead and enhance efficiency. Ensuring the integrity of the autonomous agents' functions while mitigating vulnerabilities to tampering or malicious agents is crucial. Moreover, the ability to streamline and expedite transactional processes without incurring excessive costs or delays emerges as a central issue.

Therefore, in light of the foregoing technical problems, there exists a need to overcome the aforementioned problems associated with existing autonomous agents.

SUMMARY

The present invention introduces a distributed computer system to enable an efficient interoperability and scalability of autonomous agents across a plurality of domains. It will be appreciated that the distributed computer system enhances the agent-to-agent communication and coordination process by incorporating a secondary distributed ledger arrangement. The offloading of processing tasks from the primary distributed ledger arrangement to the secondary distributed ledger arrangement not only elevates the scalability but also reduces gas costs and computational overhead, thus optimizing the performance of the distributed computer system. Notably, the secondary distributed ledger arrangement facilitates privacy preservation during collective learning, sharing model updates without exposing underlying data. Additionally, the proposed clustering of the autonomous agents with similar domains amplifies model learning efficiency. The introduction of a relayer further ensures consensus maintenance across chains, thereby enhancing overall system reliability.

In one aspect, there is provided a distributed computer system that enables application of autonomous agents across a plurality of domains, the distributed computer system comprising a plurality of modular and extensible software modules configured to operate as a plurality of autonomous agents comprised within a plurality of computing devices, wherein the autonomous agents are communicably coupled to each other, wherein the distributed computer system further comprises:

a primary distributed ledger arrangement configured to implement a software framework, wherein the software framework comprises:

a client-agent device configured to receive a service request, to generate an objective associated with the service request and to send the objective to an agent device;

a processing arrangement configured to create clusters of the plurality of autonomous agents based on similarity of their functionalities; and a secondary distributed ledger arrangement configured to coordinate a collective learning of the plurality of autonomous agents by sharing model updates with the clusters, wherein the plurality of autonomous agents in a given cluster is configured to train at least one computing model using information comprised in the at least one secondary distributed ledger arrangement, wherein the secondary distributed ledger arrangement further comprises:

at least one first secondary distributed ledger, configured to offload a context generation task from the primary distributed ledger arrangement, comprising a language model module configured to send the context of the service request in response to receiving the service request from the agent device, and at least one second secondary distributed ledger, configured to offload the collective learning task from the primary distributed ledger arrangement, comprising a machine learning model agent configured to:

send a list comprising the plurality of autonomous agents that are associated with the objective to the agent device, and send a protocol specification update to the agent device;

wherein the agent device comprises:

a context builder software module configured to interactively communicate with the machine learning model agent on the at least one second secondary distributed ledger to obtain the list, a protocol specification module configured to generate a protocol specification for the fulfilment of the service request based on the received protocol specification update, and a build executor module configured to compose each autonomous agent associated with the objective into a further autonomous agent, wherein the further autonomous agent is configured to implement the at least one protocol specification to fulfil the service request by the client-agent device.

In another aspect, there is provided a method for enabling application of autonomous agents across a plurality of domains, the method comprising:

receiving, at a client-agent device, a service request and generating an objective associated with the service request and sending the generated objective to an agent device, wherein a software framework is implemented using a primary distributed ledger arrangement, wherein the software framework comprises the client-agent device and the agent-device, and wherein the distributed computer system comprises a plurality of modular and extensible software modules configured to operate as a plurality of autonomous agents comprised within a plurality of computing devices, wherein the autonomous agents are communicably coupled to each other;

creating clusters of the autonomous agents based on similarity of their functionalities using a processing arrangement;

coordinating a collective learning of the plurality of autonomous agents by sharing model updates with the clusters using a secondary distributed ledger arrangement, wherein the plurality of autonomous agents in a given cluster are configured to train at least one computing model using information comprised in the at least one secondary distributed ledger arrangement, wherein the secondary distributed ledger arrangement comprises at least one first secondary distributed ledger and at least one second secondary distributed ledger, wherein the at least one first secondary distributed ledger implements a step of offloading a context generation task from the primary distributed ledger arrangement to the at least one first secondary distributed ledger, wherein the at least one first secondary distributed ledger comprises a language model module configured to send the context of the service request in response to receiving the service request from the agent device, and wherein the at least one second secondary distributed ledger implements a step of offloading the collective learning task from the primary distributed ledger arrangement, comprising a machine learning model agent configured to:

sending a list comprising the plurality of autonomous agents associated with the objective to the agent device, sending a protocol specification update to the agent device, wherein the agent device comprises a context builder software module configured to interactively communicate with the machine learning model agent on the at least one secondary distributed ledger to obtain the list, generating a protocol specification for fulfilling the service request using a protocol specification module based on the received protocol specification update, and composing each autonomous agent associated with the objective into a further autonomous agent using a build executor module, wherein the further autonomous agent is configured to implement the at least one protocol specification to fulfil the service request by the client-agent device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B illustrate a flowchart illustrating steps of a method for enabling application of autonomous agents across a plurality of domains, in accordance with an embodiment of the present disclosure.

Figure 1:
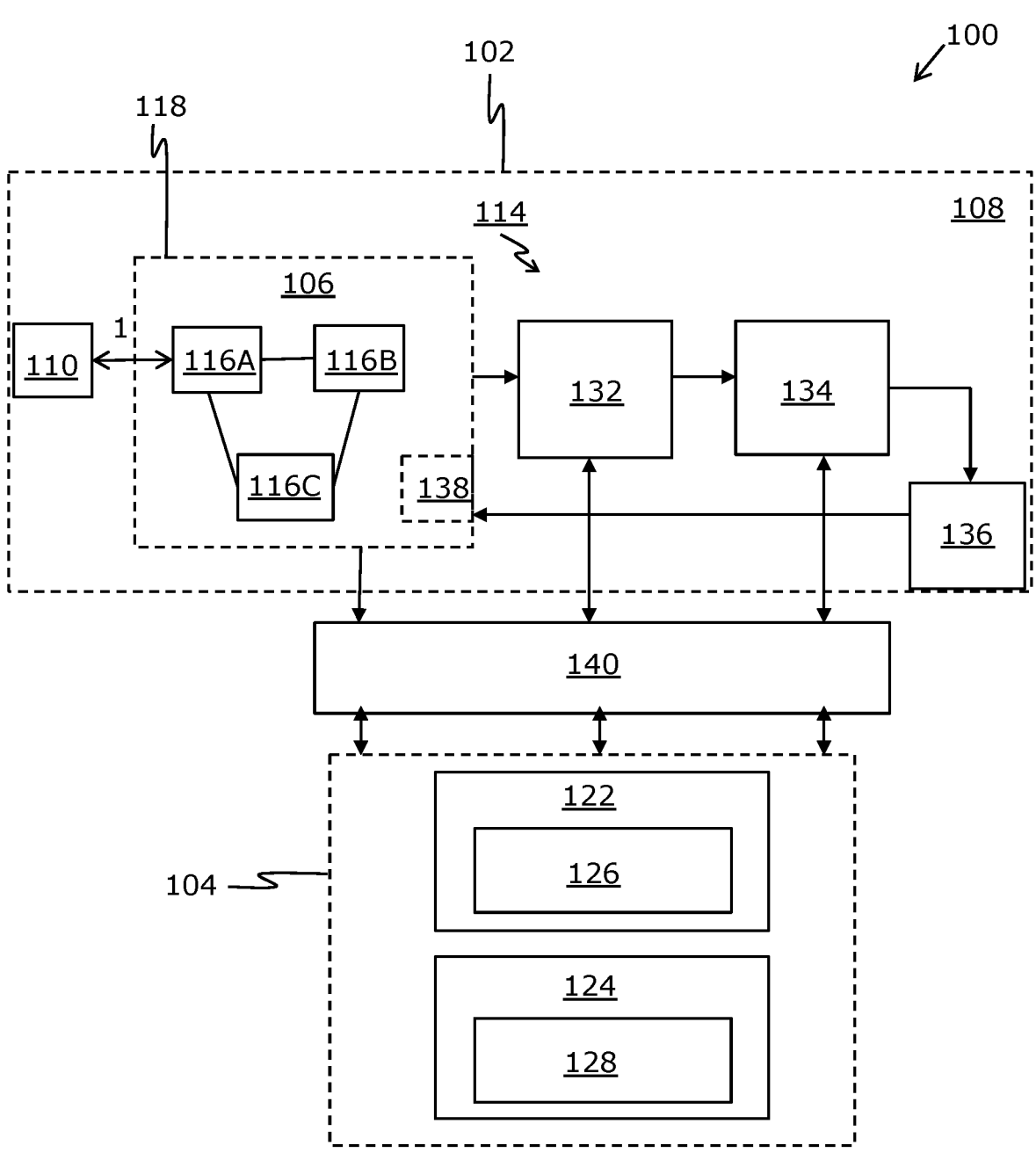
FIG. 1 is a block diagram of a system that enables application of autonomous agents across a plurality of domains, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The distributed computer system and the method provided in the present disclosure enable the application of autonomous agents across diverse domains. The distributed computer system enhances the functionality of the plurality of autonomous agents. The primary distributed ledger arrangement implements the software framework that fosters effective interaction between various components in the distributed computer system. The client-agent device's capability to receive the service requests and generate objectives facilitates targeted responses, streamlining actions.

The processing arrangement is configured to execute the formation (i.e. to form) of clusters based on the similarity of functionalities and/or capabilities of the autonomous agents. Each cluster empowers the autonomous agents to learn collaboratively. Since processing arrangement is configured to form the clusters before the secondary distributed ledger arrangement shares model updates with the clusters, the secondary distributed ledger arrangement may be configured to coordinate the sharing of the models by sharing only the relevant models with each cluster. Herein the relevant models are identified based on functionalities and/or capabilities of the plurality of autonomous agents in the cluster. The at least one secondary distributed ledger has a prior access to models used by the plurality of autonomous agents. In this regard, the autonomous agents share the model updates with the at least one secondary distributed ledger. It will be appreciated that the autonomous agents share only the model updates instead of sharing the underlying data comprised by the full model. As a result, the privacy of data held by the plurality of autonomous agents is maintained. By sharing only the model updates with the clusters, significant computer resources are saved since the full model underlying data does not need to be shared with all agents of the plurality of autonomous agents. In practice, this results in a system that is faster, more reliable and more secure, since significant less information is shared with the plurality of autonomous agents (i.e. nodes participants of the system). Herein, the functionalities and/or capabilities of plurality of autonomous agents are based on data and/or models that define the behavior of plurality of autonomous agents. This synergy of shared learning enhances accuracy and efficiency across the plurality of autonomous agents. The secondary distributed ledger arrangement amplifies the collaborative learning by sharing model updates with the clusters, enabling the plurality of autonomous agents to train the at least one computing models collectively. The autonomous agents are clustered based on similarity of their functionalities and/or capabilities. In this regard, the similarity of their functionalities and/or capabilities is identified based on data and/or models that define the behavior and capabilities of the plurality of autonomous agents. Further, the similarity of their functionalities and/or capabilities is identified based on the tasks being handled by the plurality of autonomous agents. Functionalities of autonomous agents are defined as being similar (within a tolerance threshold) when the tasks the agents have provided or will provide, are considered similar (within a second tolerance threshold). The similarity of the plurality of autonomous agents is identified based on their functionalities or based on their capabilities or, alternatively, based on combination of their functionalities and of their capabilities.

Moreover, the at least one first secondary distributed ledger offloads the context generation, enhancing efficiency by addressing the computational load. The at least one second secondary distributed ledger contributes significantly to the collective learning by enabling the exchange of the information and the protocol specifications. The agent device's context builder, protocol specification module, and build executor form a unified structure that refines responses of the plurality of autonomous agents. Furthermore, the distributed computer system comprises the further autonomous agent, capable of implementing complex protocol specifications for service fulfilment.

Throughout the present disclosure the term "autonomous agents" as used herein, relates to computational entities or software programs that are designed to perform tasks or make decisions autonomously, without direct human intervention. The autonomous agents could perceive their environment, analyze information, and take actions based on predefined rules, algorithms, or learning capabilities. Optionally, the autonomous agent is an autonomous economic agent (AEA). In this regard, an autonomous micro-agent is optionally a micro autonomous economic agent. Optionally, the autonomous economic agent (AEA) relates to a software module, or any device comprising at least one software module that is configured to execute one or more tasks. Such tasks may include communication of the autonomous economic agents (AEAs) with each other, processing of information, and so forth. In an example, the autonomous economic agents (AEAs) are configured to employ artificial intelligence (AI) algorithms and machine learning for the execution of the one or more tasks.

The distributed computer system comprises a plurality of modular and extensible software modules configured to operate as the autonomous agents meaning that the autonomous agents are modular and extensible, thus the autonomous agents are self-sufficient entities communicably coupled with the distributed computer system that could function independently and could be adapted or modified as needed to fit various use cases/circumstances based on their own rules and objectives. The autonomous agents are modular, meaning that they are composed of separate parts or units that can be combined in various manners to achieve a variety of functionalities. The autonomous agents are extensible, meaning that their existing functionalities are capable of being extended further by addition of newer modular parts or units. It will be appreciated that when multiple autonomous agents work collectively for an application (i.e., use case), different steps of the application are completed by different autonomous agents. The multiple autonomous agents work in consensus to collectively reach a final outcome for achieving a required functionality of said application. Additionally, the autonomous agents could be modulated to perform new tasks, respond to changing market conditions, or interact with new environment without disrupting the overall functioning thereof or the distributed computer system it operates within. Herein, the plurality of domains may include, but is not limited to, energy, finance, supply chain, governance, manufacturing, mobility, smart cities, and internet of things (IoT) applications.

Optionally, the distributed computer system comprises a plurality of computing devices that are communicably coupled to each other. Optionally, each of the plurality of computing devices comprises at least one processor, at least one memory device, and a communication interface. Furthermore, the decentralized computing network is optionally implemented as a decentralized structured P2P (peer-to-peer) network of devices; alternatively, multi-layer communication networks are employed, wherein communication devices are migrated between the layers depending upon their technical functionality, reliability, peer-review assessment and/or trustworthiness. Specifically, the decentralized structured P2P network represents a decentralized computing environment within a P2P network.

The distributed computer system comprises the primary distributed ledger arrangement that is configured to implement the software framework. Herein, the term "primary distributed ledger arrangement" refers to a foundational component of the distributed computer system, operating as a main chain. The primary distributed ledger arrangement encompasses a network of interconnected computing devices, including an agent network facilitating direct communication between the autonomous agents without transactional involvement, and a software framework governing the interactions and functionalities of the autonomous agents. Herein, the software framework encompasses any software abstraction which can have one or more software modules to provide generic and/or specific functionality (or specific functionalities). Optionally, the software framework is an agent framework. The agent framework may be a framework that enables the creation of application-specific autonomous agents, an open economic framework (OEF)

employing autonomous agents (AAs), or a framework designed for developers (person or by artificial intelligence) to develop applications where both agents and a large language model are included in the application. The software framework provides the infrastructure and resources for the autonomous agents to communicate, negotiate, and exchange value in a secure and transparent manner. Optionally, the software framework includes the plurality of autonomous agents which are communicably interconnected using a direct network link (such as a decentralized computing network).

Herein, the client-agent device is communicably coupled with the agent-device that enables operation of the client-agent device within complex environments. Herein, the agent-device refers to a computing device or software module that operates as an autonomous agent within the distributed computer system. It will be appreciated that the agent-device possesses an ability to incorporate external resources and collaborate with other agent-devices to perform tasks that would be difficult for the client-agent device to accomplish alone. Optionally, the agent-device promotes secure co-learning of the client-agent device. In an example, the client-agent device includes a portable communication device. For example, the client-agent device is at least one of a smartphone, a laptop computer or a tablet computer or a software module in the user device. Optionally, the client-agent device could be an interface between the agent-device and an agent marketplace, enabling autonomous participation and decision-making within the ecosystem.

The term "autonomous agents-based functionalities" as used herein refers to one or more functionalities of the autonomous agents, that enable the autonomous agents to serve the service request. Such functionalities may be enabling digital payments, generating product recommendations, resolving customer queries, and the like. The term "service request" as used herein refers to a specific action or communication made by a user, typically through a digitalized system, to seek a particular service or assistance. Optionally, the service request can take various forms, such as direct interactions with digital interfaces like voice assistants (such as Siri, Alexa, ChatGPT, and so forth), inputting information into dedicated applications, or entering appointments into personal calendars. Optionally, the service request may include metadata, which is additional information accompanying the request, and is utilized by the Large Language Model (LLM) to provide relevant inferences or responses. Optionally, the service request may originate from individuals or authorized entities, including the digital twins or company Large Language Models (LLMs) empowered to request services on behalf of the clients, such as arranging travel services.

In an embodiment, the service request includes at least one of a time needed for providing the service, a price associated with the service (such as a minimum and maximum price associated with the service), a quality associated with the service, and/or at least one preference associated with the service. For example, the user specifies a parameter (such as, using the graphical user interface associated with client-agent device including at least one of: time, price, quality and/or at least one preference that is required by the user in the provided service. In such an instance, the parameter is provided to the client-agent device (client-AA) with the generated service request.

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM). For example, a user using a travel planning application on their smartphone can make a service request to book a hotel. Optionally, the software application could be a home automation hub that is communicably coupled to the user's device (such as a smartphone) through a wireless connection. Optionally, the cloud-based software application could be a Google Calendar. Optionally, the service request can be received from the digital twin that refers to a virtual representation of a given user. Optionally, the given digital twin employs simulation, machine learning and reasoning to assist in decision-making. For example, the digital representation could be a chatbot or an avatar that interacts with the distributed computer system on the user's behalf.

The term "objective" as used herein refers to a desired outcome or goal that the client-agent device aims to achieve based on the service request received therethrough. Optionally, the objective defines the purpose or intent behind the service request. In this regard, the objective is generated by the client-agent device. The objective is typically formulated in a structured manner to provide clarity and guidance for the subsequent actions of the client-agent device and the plurality of autonomous agents in the distributed computer system. For example, the objective could be to book a flight to Paris, when the service request is to find and book a flight to Paris. In another example, the objective could be to schedule a meeting with an individual on a specific day. In yet another example, the objective could be to order groceries and deliver them by a specified date. Moreover, the generated objective is communicated to the agent device, ensuring that the plurality of autonomous agents possess a clear understanding of the service request they need to undertake. It will be appreciated that the client-agent device generates the objective to ensure an effective communication and a well-defined context for the subsequent actions taken by the plurality of autonomous agents in response to the service request.

The term "processing arrangement" as used herein refers to a component designed to execute specific computational tasks or operations. The distributed computer system comprises the processing arrangement. The processing arrangement encompasses hardware, software, or a combination of both, programmed to perform predefined functions. The processing arrangement is used to carry out operations, transformations, or manipulations on data or other inputs to produce desired outputs. Optionally, the processing arrangement could be implemented using various computing devices, including computers, servers, processors, and dedicated hardware modules.

Herein the "data" refers to information, records, or values that are collected, stored, processed, or analyzed within the distributed computer system. Optionally, the data include various types of information such as text, numbers, images, audio, video, and so forth. Herein, the term "models" refer to representations, algorithms, or mathematical formulations designed to predict, describe, or analyze real-world phenomena based on input data. In this regard, the processing arrangement takes input from the plurality of autonomous agents within the distributed computer system, which includes data and/or models associated with their respective functionalities. The data comprises information required by the autonomous agents to perform a task to fulfil a service request. The models encompass various attributes, parameters, and characteristics that define the behavior and capabilities of the plurality of autonomous agents. Optionally, by leveraging the information gathered, the processing arrangement employs algorithms and similarity metrics to identify the plurality of autonomous agents that exhibit substantial commonalities in terms of their attributes, domain of operation, and task-specific parameters.

In an example, the plurality of agents handling similar types of the service requests or having analogous parameters are grouped together within clusters. The clustering is akin to creating a neighborhood of the plurality of autonomous agents sharing related objectives. Once the clusters are formed, the plurality of autonomous agents can interact more efficiently, exchange insights, and collectively learn from their shared experiences.

In this regard, the clusters are formed based on domain similarity to enable the autonomous agents within the same domain to collaborate more effectively on the primary distributed ledger arrangement. It will be appreciated that the clusters of the similar domains optimize the learning process, leading to improved performance and outcomes within their respective domains.

The distributed computer system comprises the secondary distributed ledger arrangement. The term "secondary distributed ledger arrangement" as used herein refers to a structured configuration designed to facilitate and manage collective learning among the plurality of autonomous agents. The secondary distributed ledger arrangement involves utilizing a distributed ledger, which is a decentralized database, to coordinate the sharing of updates related to machine learning models among agents grouped in the cluster.

The term "collective learning" as used herein refers to a collaborative process wherein the plurality of autonomous agents work together to enhance the individual learning capabilities thereof. It will be appreciated that the collective learning involves the exchange of knowledge, data, or model updates among agents to collectively improve their machine learning models.

In this regard, the secondary distributed ledger arrangement operates in conjunction with the primary distributed ledger arrangement. The secondary distributed ledger arrangement prevents unnecessary data overload and computational burden on the primary distributed ledger arrangement. It will be appreciated that by utilizing the secondary distributed ledger arrangement, the distributed computer system avoids the congestion and resource-intensive processes that could occur if all updates were directly processed on the primary distributed ledger arrangement. The secondary distributed ledger arrangement ensures scalability and optimal utilization of resources of the distributed computer system.

The secondary distributed ledger arrangement comprises one or more first secondary distributed ledgers, each serving a distinct purpose. Herein, the term "context generation task" refers to a process of generating relevant contextual information in response to the service request. The context generation task involves creating a detailed understanding of the specific requirements and objectives presented in the service request. Herein, the term "language model module" in the refers to a software component designed to understand and process natural language text. Optionally, the language model module can employ advanced algorithms and techniques to analyze the content of the text, extract relevant information, and generate contextually relevant responses.

The at least one first secondary distributed ledger serves the purpose of offloading the context generation task from the primary distributed ledger arrangement. It will be appreciated that offloading the context generation task the primary distributed ledger arrangement can focus on its core functions, such as transaction processing and execution of the service request. This optimization leads to reduced processing times and improved system responsiveness.

In this regard, when the service request is received from the agent device, the language model module is activated. The language model module analyzes the content of the service request, extracts relevant contextual information, and generates an appropriate context for the request. The context is then sent back as a response to the agent device, enabling it to proceed with the requested service.

The at least one second secondary distributed ledger serves the purpose of offloading the collective learning task and additional tasks required to fulfill the service request from the primary distributed ledger arrangement. It will be appreciated that the at least one second secondary distributed ledger helps in fulfillment of service request by offloading the tasks such as identifying the agents associated with the service request, identification of protocol specification updates for the associated agents. Throughout this disclosure, it will be appreciated that offloading of tasks comprises transferring a task, in particular the resource-intensive computational tasks, from the primary distributed ledger to the at least one secondary distributed ledger. The offloading of tasks has the effect of reducing the computational time for fulfillment of service request and the resources on the primary distributed ledger are available to increase scalability of the system.

The term "at least one second secondary distributed ledger" refers to one or more additional side chains designed to handle specific tasks more efficiently by offloading them from the primary distributed ledger arrangement. Herein, the term "collective learning task" involves the plurality of autonomous agents working together to enhance their capabilities through shared learning. Herein, the term "machine learning model agent" refers to a component that facilitates machine learning processes within the distributed computer system. Moreover, the machine learning model agent employs advanced algorithms and data analysis techniques to train and improve machine learning models based on data and inputs. The machine learning model agent could be an autonomous agent that specializes in machine learning tasks and has the ability to provide insights and information based on previous queries or experiences. Herein, the term "list" refers to an organized collection of the plurality of autonomous agents associated with a specified objective. Herein, the term "protocol specification update" refers to a set of new or modified instructions and guidelines for the operation of the plurality of autonomous agents in the distributed computer system.

In this regard, the at least one second secondary distributed ledger comprises the machine learning model agent responsible for facilitating the collective learning process. Moreover, upon receiving the service request, the agent device of the primary distributed ledger arrangement offloads the collective learning task to the machine learning model agent which then generates the list comprising the relevant plurality of autonomous agents associated with the. In other words, the list identifies the plurality of autonomous agents capable of addressing the service request effectively. Furthermore, the machine learning model agent then sends the protocol specification update to the agent device. Optionally, the protocol specification update provides instructions and guidelines for the plurality of autonomous agents to fulfill the service request using optimized collective learning strategies. The technical effect of employing the at least one second distributed ledger in the distributed computer system is to provide improved learning and enhanced capabilities thereto without burdening the primary distributed ledger arrangement.

The term "context-builder software module" as used herein refers to a component of the agent-device within the distributed computer system. It is responsible for building the context necessary to execute the service request associated with the objective received from the client-agent device. In this regard, upon receiving the objective, the context-builder software module sends the service request to the machine learning model agent in order to obtain the list therefrom. Optionally, the context-builder software module engages in a dynamic exchange of information with the machine learning model agent to determine the sequence or prioritization of tasks. For example, when the objective is to plan a vacation, and there are multiple tasks involved, such as booking flights, reserving accommodation, and arranging transportation. In such a case, the context-builder software module communicates with the machine learning model agent to obtain insights and recommendations on the optimal order in which these tasks should be executed. Moreover, the machine learning model agent might provide recommendations based on factors like availability, cost, or user preferences.

Optionally, by interacting with the machine learning model agent, the context-builder software module effectively manages the autonomous agents associated with the objective. It obtains a relevant list of agents, blocks communication signals to non-associated agents, and associates tasks with the appropriate agents. This allows for efficient coordination and execution of the service request within the distributed computer system, ensuring that the objective is accomplished effectively and in a timely manner.

Optionally, the software framework includes a domain-independent protocol specification language. The term "domain-independent protocol specification language" as used herein refers to a formal language that enables the definition of protocols for interactions across the plurality of problem domains. In this regard, the domain-independent protocol specification language is used to describe the format, structure, and rules for communication between at least one autonomous agent, between the client-agent device and the agent-device and between the plurality of autonomous agents and the plurality of computing devices, regardless of the specific application domain or context. It will be appreciated that the domain-independent protocol specification language provides a standardized way of defining protocols that enables interoperability and seamless communication among the plurality of autonomous agents in the distributed computer system, regardless of the domain thereof. Moreover, the domain-independent protocol specification language in the software framework promotes fairness, transparency, and efficiency in the distributed computer system. Furthermore, the domain-independent protocol specification language enables the distributed computer system to become scalable for providing multi-domain services.

Optionally, the domain-independent protocol specification language is stored in a form of a set of instructions, in at least one memory device of the decentralized computing network. Optionally, the at least one memory device may be a physical memory device, such as a hard drive or a flash drive, or a virtual memory device, such as a cloud-based server.

The agent device comprises a protocol specification module. The term "protocol specification module" as used herein refers to a software tool that generates protocol(s) for autonomous agents using the domain-independent protocol specification language. The term "protocol" as used herein refers to an implementation of the rules and guidelines described in a protocol specification. In other words, the at least one protocol is one of the critical building blocks and abstractions that define communications of the client-agent device. The at least one protocol of the client-agent device defines interactions of the client-agent device with other autonomous agents amongst the plurality of autonomous agents, and with the plurality of computing devices. Moreover, the at least one protocol defines how messages are encoded for a transportation thereof.

In this regard, the protocol specification module uses the protocol specification update received from the at least one second secondary distributed ledger to create the protocol specification that outlines how the client-agent device and the plurality of autonomous agents should interact to fulfill the service request.

In an example, the distributed computer system is utilized for an autonomous ride-sharing service. In such a case, a user requests a ride through the client-agent device, specifying their pickup location, destination, and any preferences. The objective is to seamlessly match the user with an available autonomous vehicle and provide a convenient and efficient ride. The context builder software module communicates with the machine learning model agent on the at least one second secondary distributed ledger. It obtains a list of available autonomous vehicles, each with its own capabilities, location, and availability status. This information is vital for selecting the right vehicle to fulfill the user's ride request.

The protocol specification module takes the obtained list and the protocol specification update from the at least one second secondary distributed ledger. It generates the protocol specification that dictates how the client-agent device and the selected autonomous vehicle should interact to fulfill the user's ride request. For example, the protocol may specify: a format of the initial request from the client-agent device to the autonomous vehicle. The acknowledgment and acceptance response from the autonomous vehicle. The real-time updates and communication between the client-agent device and the vehicle regarding estimated arrival time, route, and any delays. The confirmation of successful completion of the ride and payment processing.

The generated protocol guides the communication and interactions between the client-agent device and the selected autonomous vehicle. The client-agent sends the ride request with the specified parameters, and the vehicle responds with acknowledgment. As the ride progresses, real-time updates are exchanged as per the protocol, ensuring that the user remains informed about the ride's status. For instance, if the vehicle encounters unexpected traffic, it may send a notification to the client-agent device with an updated estimated arrival time. The protocol ensures that both parties communicate effectively, providing a seamless ride experience.

The term "build executor software module" as used herein refers to a component within the software framework that is specifically designed to handle the composition and execution of tasks within the distributed computer system. The build executor software module is responsible for composing each task associated with the objective in a specific order. Optionally, the build executor software module ensures that the tasks are organized and arranged according to a predefined sequence or priority.

Moreover, the build executor software module also composes each autonomous agent associated with the objective into a further autonomous agent. The further autonomous agent can be understood as a composite autonomous agent that combines the capabilities and functionalities of the individual associated with the objective. Furthermore, to maintain the security and integrity of the distributed computer system, the build executor software module encrypts access to the further autonomous agent. Optionally, by encrypting the access, it ensures that unauthorized entities cannot tamper with or manipulate the further-AA. This security measure safeguards the execution of tasks and protects the distributed computer system from potential threats or unauthorized access. Optionally, the step of encrypting the access to the further autonomous agent need not necessarily be implemented in all embodiments of the present disclosure. In other words, such encryption may be performed only optionally.

The further autonomous agent, which is a composite of the autonomous agent(s) associated with the objective, is configured to implement the at least one protocol specification generated by the distributed computer system. Moreover, the further autonomous agent executes the service request associated with the objective based on the defined protocol specification. Furthermore, the further autonomous agent automatically executes the service request, carrying out the necessary actions or operations to fulfil the service request.

Optionally, the composability of tasks is how the tasks are combined to fulfil a complex service request. Optionally, the further autonomous agent is a combination of two or more autonomous agents to perform complex action. Optionally, when an existing agent cannot be used to perform the task associated with the objective of service, a new agent is created. In the distributed computer system proposed, creation of new agent is validated by the Large Language Model (LLM) and/or ML models and the agents communicate within themselves using peer to peer encrypted communication. The plurality of autonomous agents participating in execution of tasks associated with the objective of the service request use encryption methods to communicate within themselves and other autonomous agent who are not participating in the tasks of the service request are blocked from communication to prevent any third-party access.

Optionally, the creation of new agent is treated as a block of a blockchain network, and after validation by the ML model and/or LLM and/or by existing agents using association with the task, each new agent created is appended to the chain of agents just like new block is connected to the existing blocks of a blockchain. Similar, to the blockchain network, once an agent has been created after validation, the distributed computer system may have the agent holding the transaction information such as metadata associated with the task. The technical effect of treating the agents as blocks of blockchain is that the proposed system provides a way such that tampering with the functioning of agent can be avoided as it is almost impossible to modify the block once the transaction has been validated. With such a distributed computer system, the service tasks are performed as planned and third-party attacks can be avoided. New agents created are cryptographically linked together just like blocks of a blockchain and are immutable, the functioning of agents cannot be altered. The distributed computer system provides a secure and transparent way to automatically execute the service request.

Optionally, the clusters of the plurality of autonomous agents are created using a search and discovery (S&D) component, wherein the search and discovery component is configured to find, using a database, the plurality of autonomous agents in the similar domains.

Herein, the search and discovery component and database refer to software components. Optionally, the database stores information about autonomous agents and their components. The database contains details such as agent capabilities, skills, protocols, and connections. Optionally, the database acts as a centralized repository where information about available autonomous agents is maintained. Optionally, the search and discovery component is responsible for efficiently categorizing the plurality of autonomous agents into clusters that share similar domains. Optionally, the search and discovery component utilizes the database to search for suitable agents based on their capabilities and characteristics.

It will be appreciated that the clustering of the plurality of autonomous agents with similar domain allows an efficient model learning as all the plurality of autonomous agents will be able to participate and contribute in learning of the model. In an example, the distributed computer system employs the search and discovery component, that utilizes the database, to efficiently categorize the plurality of autonomous agents into the clusters that share similar medical domains. This ensures that the plurality of autonomous agents with expertise in specific medical specialties could work together effectively and provide specialized healthcare services. In such a case, the search and discovery component query the database for the plurality of autonomous agents that possess specialized medical skills, protocols, and connections related to specific healthcare domains. The search and discovery component identifies the plurality of autonomous agents with expertise in cardiology, neurology, orthopedics, and other medical fields, based on the information stored in the database. Upon finding the plurality of autonomous agents, the search and discovery component categorizes them into the given cluster specifically focused on the cardiology. The given cluster can then collectively learn, and share insights related to the cardiology, enhancing the distributed computer system's ability to provide accurate and specialized healthcare services to patients with heart conditions.

Optionally, the clusters of the plurality of autonomous agents are created using a loss matrix. The term "loss matrix" as used herein refers to a matrix that represents the distances between the data and models held by the plurality of autonomous agents in the distributed computer system. Optionally, the loss matrix could serve as a measure of similarity between the capabilities and characteristics of the plurality of autonomous agents. It will be appreciated that the creation of the clusters enhances the collective learning by grouping the plurality of autonomous agents that have similar expertise and could contribute effectively to fulfilment of the service request. Optionally, the processing arrangement utilizes the loss matrix to calculate the similarity or distance between the data/models held by the plurality of autonomous agents. Optionally, the plurality of autonomous agents with smaller distances between their capabilities are clustered together, as they possess similar expertise or data/models.

In an example, the distributed computer system is used for optimizing manufacturing processes. In such a case, the plurality of autonomous agents with capabilities related to optimizing different aspects of the manufacturing process (such as supply chain, production, quality control) are part of the distributed computer system. The loss matrix is employed to measure the similarity between the capabilities of the plurality of autonomous agents.

For instance, two autonomous agents that specialize in supply chain optimization and production efficiency might have similar loss matrix values, indicating that their capabilities are closely aligned. In this regard, the processing arrangement utilizes the loss matrix to group the two autonomous agents into a given cluster that specializes in manufacturing optimization. This ensures that the two autonomous agents with complementary expertise collaborate to collectively improve manufacturing efficiency.

Optionally, the distributed computer system further comprises a relayer, operatively coupled to the primary distributed ledger arrangement and the secondary distributed ledger arrangement, configured to facilitate communication therebetween. The term "relayer" as used herein refers to an interoperability protocol designed to facilitate communication and consensus between the primary distributed ledger arrangement and the secondary distributed ledger arrangement. In this regard, the relayer ensures that state updates, model rules, context information, and the protocol specification are seamlessly and accurately exchanged between the primary distributed ledger arrangement and the secondary distributed ledger arrangement. It will be appreciated that the relayer enhances interoperability and coordination between the primary distributed ledger arrangement and the secondary distributed ledger arrangement. Thus, leading to effective collective learning, context generation, and protocol execution.

Moreover, the relayer guarantees safety and consensus of the validator state on each of the primary distributed ledger arrangement and the secondary distributed ledger arrangement before relaying information. This involves checking the finality and validation of the state on both networks to ensure accurate synchronization.

In an example, when the service request is received by the distributed computer system, the context builder software module interacts with the machine learning model agent to receive the context using the relayer. Furthermore, the protocol specification module, connected to the machine learning model agent, receives the protocol specification using the relayer.

Optionally, the primary distributed ledger arrangement is configured to curate a historical database, wherein the historical database comprises the context, the protocol specification, and the plurality of autonomous agents corresponding to the service request, and wherein, upon encountering a new service request that matches the service request stored within the historical database, the new service request is executed. The term "historical database" as used herein refers to a curated collection of past interactions, including the context, the protocol specifications, and associated autonomous agents' information. The primary distributed ledger arrangement is responsible for maintaining the historical database. The historical database serves to optimize the execution of the new service requests. It will be appreciated that the distributed computer system could avoid redundant queries to the secondary distributed ledger arrangement by storing previous service requests' details, including their corresponding context, protocol specifications, and related autonomous agents' data.

Optionally, when the new service request is encountered, the primary distributed ledger arrangement first checks if the request matches any previous service request stored within the historical database. If a match is found, it indicates that a similar request has been executed in the past. In such cases, the distributed computer system could directly execute the new service request based on the historical context, protocol specifications, and autonomous agents' information, without the need to query the secondary distributed ledger arrangement. This optimized process significantly speeds up the execution of the new service request, thereby avoiding unnecessary delays and resource consumption.

Optionally, the secondary distributed ledger arrangement is configured to maintain a library of the service requests associated with the plurality of autonomous agents, wherein the library is used to search and discover for a new service request. The term "library" as used herein refers to a repository containing records of service requests linked to the plurality of autonomous agents. In this regard, the secondary distributed ledger arrangement is configured for maintaining the library. Advantageously, the library provides the efficiency and accuracy of discovering suitable autonomous agents for fulfilling the new service requests. Beneficially, the distributed computer system could facilitate faster identification of the suitable autonomous agents amongst the plurality of autonomous agents for executing similar or related tasks by preserving records of the past service requests and their associated autonomous agents. The library eliminates the need to generate the new protocol specifications and facilitates direct execution based on past experiences.

The secondary distributed ledger is configured to store information pertaining to the respective computing model, autonomous agents associated therewith, and a contribution of each of the autonomous agents in their respective cluster in relation to training the respective computing model.

The present disclosure also relates to the method as described above. Various embodiments and variants disclosed above apply mutatis mutandis to the method.

Optionally, the creation of the clusters of the plurality of autonomous agents is performed using on a search and discovery (S&D) component, wherein the search and discovery component is configured to find, using a database, the plurality of autonomous agents in the similar domains.

Optionally, the creation of the clusters of the plurality of autonomous agents is performed using a loss matrix.

Optionally, the method further comprises using a relayer for facilitating communication between the primary distributed ledger arrangement and the secondary distributed ledger arrangement.

Optionally, the method further comprises curating a historical database using the primary distributed ledger arrangement, wherein the historical database comprises the context, the protocol specification and the plurality of autonomous agents corresponding to the service request, and wherein, executing the new service request, upon encountering a new service request that matches the service request stored within the historical database.

Optionally, the method further comprises maintaining a library of the service requests associated with the plurality of autonomous agents using the secondary distributed ledger arrangement, wherein the library is used to search and discover for a new service request.

DETAILED DESCRIPTION OF THE DRAWINGS

Referring to FIG. 1, a block diagram of a distributed computer system 100 that enables application of autonomous agents across a plurality of domains, in accordance with an embodiment of the present disclosure. The distributed computer system 100 comprises a primary distributed ledger arrangement 102, a secondary distributed ledger arrangement 104 and a processing arrangement 106. The primary distributed ledger arrangement 102 is configured to implement a software framework 108. The software framework 108 comprises a client-agent device 110 and an agent device 114. As shown, the client-agent device 110 is configured to receive a service request (at 1), to generate an objective associated with the service request and to send the objective to an agent device 114. The processing arrangement 106 is configured to create clusters of a plurality of autonomous agents such as 116A-C based on similarity of their data/models. The distributed computer system 100 comprises a plurality of modular and extensible software modules configured to operate as the plurality of autonomous agents 116A-C comprised within a plurality of computing devices. The plurality of autonomous agents 116A-C is communicably coupled to each other as shown.

The secondary distributed ledger arrangement 104 is configured to coordinate a collective learning of the plurality of autonomous agents 116A-C by sharing model updates with the clusters. The plurality of autonomous agents 116A-C in a given cluster 118 is configured to train at least one computing model using information comprised in the secondary distributed ledger arrangement 104. The secondary distributed ledger arrangement 104 comprises at least one first secondary distributed ledger 122 and at least one second secondary distributed ledger 124.

The at least one first secondary distributed ledger 122 is configured to offload a context generation task from the primary distributed ledger arrangement 102. The at least one first secondary distributed ledger 122 comprises a language model module 126 that is configured to send the context of the service request in response to receiving the service request from the agent device 114.

The at least one second secondary distributed ledger 124 is configured to offload the collective learning task from the primary distributed ledger arrangement 102. The at least one second secondary distributed ledger 124 comprises a machine learning model agent 128 configured to send a list comprising the plurality of autonomous agents 116A-C that are associated with the objective to the agent device 114, send a protocol specification update to the agent device 114.

As shown, the agent device 114 comprises a context builder software module 132, a protocol specification module 134 and a build executor module 136. The context builder software module 132 is configured to interactively communicate with the machine learning model agent 128 on the at least one second secondary distributed ledger 124 to obtain the list. The protocol specification module 134 is configured to generate a protocol specification for the fulfilment of the service request based on the received protocol specification update.

The build executor module 136 is configured to compose each autonomous agent associated with the objective into a further autonomous agent 138. The further autonomous agent 138 is configured to implement the at least one protocol specification to fulfil the service request by the client agent device 110.

Optionally, the distributed computer system 100 further comprises a relayer 140, operatively coupled to the primary distributed ledger arrangement 102 and the secondary distributed ledger arrangement 104, configured to facilitate communication therebetween.

Figure 2A:
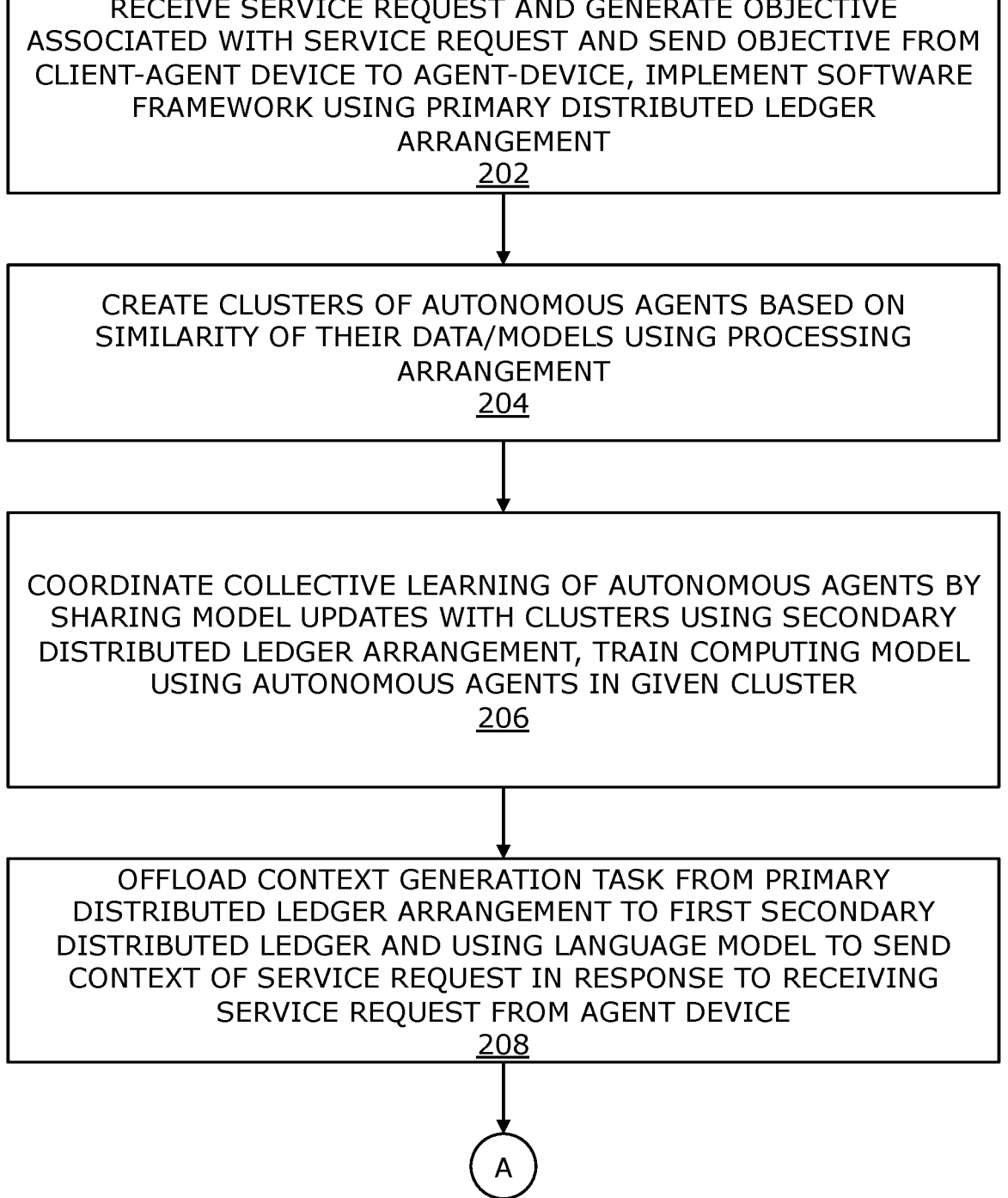

Referring to FIGS. 2A and 2B, illustrated is a flowchart illustrating steps of a method for enabling application of autonomous agents across a plurality of domains, in accordance with an embodiment of the present disclosure. At 202, there is received, at a client-agent device, a service request and there is generated an objective associated with the service request, and there is sent the generated objective to an agent device, wherein a software framework is implemented using a primary distributed ledger arrangement, wherein the software framework comprises the client-agent device and the agent-device, and wherein the distributed computer system comprises a plurality of modular and extensible software modules configured to operate as a plurality of autonomous agents comprised within a plurality of computing devices, wherein the plurality of autonomous agents is communicably coupled to each other. At 204, there is created clusters of the plurality of autonomous agents based on similarity of their functionalities using a processing arrangement. At 206, there is coordinated a collective learning of the plurality of autonomous agents by sharing model updates with the clusters using a secondary distributed ledger arrangement, wherein the plurality of autonomous agents in a given cluster are configured to train at least one computing model using information comprised in the at least one secondary distributed ledger arrangement, wherein the secondary distributed ledger arrangement comprises at least one first secondary distributed ledger and at least one second secondary distributed ledger. At 208, there is implemented a step of offloading a context generation task from the primary distributed ledger arrangement to the at least one first secondary distributed ledger using the at least one first secondary distributed ledger, wherein the at least one first secondary distributed ledger comprises a language model module configured to send the context of the service request in response to receiving the service request from the agent device. At 210, there is implemented a step of offloading the collective learning task from the primary distributed ledger arrangement, wherein the at least one second secondary distributed ledger comprising a machine learning model agent configured to: sending a list comprising the plurality of autonomous agents associated with the objective to the agent device, sending a protocol specification update to the agent device, wherein the agent device comprises a context builder software module configured to interactively communicate with the machine learning model agent on the at least one secondary distributed ledger to obtain the list.

At 212, there is generated a protocol specification for fulfilling the service request using a protocol specification module based on the received protocol specification update. At 214, there is composed each autonomous agent associated with the objective into a further autonomous agent using a build executor module. At 216, there is implemented the at least one protocol specification to fulfil the service request by the client-agent device, using the further autonomous agent.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A distributed computer system that enables application of autonomous agents across a plurality of domains, the distributed computer system comprising a plurality of modular and extensible software modules configured to operate as a plurality of autonomous agents comprised within a plurality of computing devices, wherein the autonomous agents are communicably coupled to each other, the distributed computer system further comprising:

a primary distributed ledger arrangement that implements a software framework, the software framework comprising a client-agent device and an agent device, wherein the client-agent device is configured to receive a service request, generate an objective associated with the service request, and provide the objective to the agent device;

a processing arrangement configured to form and maintain clusters of the plurality of autonomous agents according to similarity metrics applied to stored agent data and/or stored agent models that define agent capabilities and task-handling characteristics;

a secondary distributed ledger arrangement configured to store and update collective learning state information for the plurality of autonomous agents, wherein the secondary distributed ledger arrangement is configured to store model updates generated by autonomous agents within a cluster independently of underlying training data used to generate the model updates, and wherein the secondary distributed ledger arrangement is configured to make the stored model updates selectively available to autonomous agents belonging to the same cluster;

wherein the secondary distributed ledger arrangement comprises:

at least one first secondary distributed ledger comprising a language model module configured to generate contextual information associated with the service request communicated via the agent device; and at least one second secondary distributed ledger comprising a machine-learning model agent configured to identify, in accordance with the objective, a set of autonomous agents associated with the objective and to provide a protocol-specification update associated with the objective;

wherein the agent device comprises:

a context-builder software module configured for data exchange with the machine-learning model agent to obtain the identified set of autonomous agents;

a protocol-specification module configured to generate at least one executable protocol in accordance with the protocol-specification update; and a build-executor module configured to compose the autonomous agents of the identified set into a further autonomous agent, wherein the further autonomous agent is configured to execute the at least one executable protocol to fulfil the service request.

2. The distributed computer system of claim 1, wherein the processing arrangement is configured to form and maintain the clusters by applying similarity metrics to stored agent data and/or stored agent models representing at least one of historical service requests handled by the autonomous agents, domain identifiers associated with the autonomous agents, or parameters of agent-specific computing models.

3. The distributed computer system of claim 2, wherein the processing arrangement is configured to apply a loss matrix representing distances between agent data and/or agent models to form and maintain the clusters.

4. The distributed computer system of claim 1, wherein the secondary distributed ledger arrangement is configured to store model updates generated by autonomous agents independently of underlying training data used to generate the model updates, and to exclude storage of the underlying training data on the secondary distributed ledger arrangement.

5. The distributed computer system of claim 1, wherein the protocol-specification update defines at least one of message formats, execution sequencing rules, or acknowledgment requirements governing interactions between the autonomous agents, and wherein the protocol-specification module is configured to generate the at least one executable protocol as a machine-interpretable data structure enforceable by the further autonomous agent.

6. The distributed computer system of claim 1, wherein the build-executor module is configured to compose the further autonomous agent by establishing cryptographic associations between the autonomous agents of the identified set, and wherein the further autonomous agent is configured to enforce access control to the at least one executable protocol using encryption.

7. A method for enabling application of autonomous agents across a plurality of domains, the method comprising:

receiving, at a client-agent device of a software framework implemented by a primary distributed ledger arrangement, a service request;

generating, by the client-agent device, an objective associated with the service request;

providing the objective from the client-agent device to an agent device;

forming and maintaining, by a processing arrangement, clusters of a plurality of autonomous agents according to similarity metrics applied to stored agent data and/or stored agent models that define agent capabilities and task-handling characteristics;

storing and updating, by a secondary distributed ledger arrangement, collective learning state information for the plurality of autonomous agents, including storing model updates generated by autonomous agents independently of underlying training data used to generate the model updates and making the stored model updates selectively available to autonomous agents belonging to the same cluster;

generating, by at least one first secondary distributed ledger of the secondary distributed ledger arrangement using a language model module, contextual information associated with the service request communicated via the agent device;

identifying, by at least one second secondary distributed ledger of the secondary distributed ledger arrangement using a machine-learning model agent and in accordance with the objective, a set of autonomous agents associated with the objective, and providing a protocol-specification update associated with the objective;

obtaining, by a context-builder software module of the agent device, the identified set of autonomous agents via data exchange with the machine-learning model agent;

generating, by a protocol-specification module of the agent device, at least one executable protocol in accordance with the protocol-specification update;

composing, by a build-executor module of the agent device, the autonomous agents of the identified set into a further autonomous agent; and executing, by the further autonomous agent, the at least one executable protocol to fulfil the service request.

8. The method of claim 7, wherein forming and maintaining the clusters comprises applying similarity metrics to stored agent data and/or stored agent models representing at least one of historical service requests handled by the autonomous agents, domain identifiers associated with the autonomous agents, or parameters of agent-specific computing models.

9. The method of claim 8, wherein forming and maintaining the clusters comprises applying a loss matrix representing distances between agent data and/or agent models.

10. The method of claim 7, wherein maintaining collective learning state information comprises storing model updates generated by autonomous agents independently of underlying training data used to generate the model updates, and excluding storage of the underlying training data on the secondary distributed ledger arrangement.

11. The method of claim 7, wherein generating the at least one executable protocol comprises generating a machine-interpretable data structure that defines at least one of message formats, execution sequencing rules, or acknowledgment requirements governing interactions between the autonomous agents, the machine-interpretable data structure being enforceable by the further autonomous agent.

12. The method of claim 7, wherein composing the further autonomous agent comprises establishing cryptographic associations between the autonomous agents of the identified set, and wherein executing the at least one executable protocol comprises enforcing access control using encryption.

* * * * *